United States Patent [19]

Lonardi et al.

[11] Patent Number: 5,273,148
[45] Date of Patent: Dec. 28, 1993

[54] DEVICE FOR UNIFORMLY SPREADING POWDERY MATERIALS

[75] Inventors: Emile Lonardi, Bascharage; Radomir Andonov, Mamer; Jeannot Loutsch, Howald; Georges Wies, Dudelange, all of Luxembourg

[73] Assignee: Paul Wurth, S.A., Luxembourg

[21] Appl. No.: 870,626

[22] Filed: Apr. 16, 1992

[30] Foreign Application Priority Data

Apr. 19, 1991 [LU] Luxembourg ............... 87922
Mar. 4, 1992 [LU] Luxembourg ............... 88076

[51] Int. Cl.⁵ ............................................. B65G 11/12
[52] U.S. Cl. ............................................. 193/3; 239/689; 193/16; 193/22
[58] Field of Search ............... 193/3, 16, 22, 23; 198/535, 536; 239/650, 668, 669, 689; 222/185, 526, 533, 564; 414/299-302

[56] References Cited

U.S. PATENT DOCUMENTS

| | | | |
|---|---|---|---|
| 1,539,559 | 5/1925 | Hamachek | 198/536 |
| 1,668,968 | 5/1928 | Lambot | 198/536 X |
| 2,872,021 | 2/1959 | Hampf | 198/536 |
| 3,485,536 | 12/1969 | Donelson, Jr. | 198/536 |
| 4,395,182 | 7/1983 | Suwyn | 239/689 X |
| 4,623,056 | 11/1986 | Flaugher | 193/23 |
| 4,718,811 | 1/1988 | Stoltzfus | 239/689 X |
| 4,754,869 | 7/1988 | Hutchinson et al. | 198/536 |
| 4,875,569 | 10/1989 | Oury et al. | 198/536 X |

Primary Examiner—D. Glenn Dayoan
Attorney, Agent, or Firm—Fishman, Dionne & Cantor

[57] ABSTRACT

A suspension system is presented for a distribution chute of a device for uniformly spreading powdery materials over a circular surface. The distribution chute is suspended in a pivoting manner from a cage in such a way that the angle of tilt of the chute in relation to the vertical axis is adjustable. This cage is suspended from a peripheral annular ring having a vertical axis. The ring is vertically supported and laterally guided by wheels circumferentially spaced apart by an angle of 120°. These wheels are mounted via bearings on a frame supporting the cage. An endless chain engages in a peripheral annular sprocket integrally connected to the cage in order to transmit to the latter a rotary motion about its vertical axis. A variant embodiment is presented with six smooth wheels, three of which have horizontal axes and three of which have vertical axes.

16 Claims, 8 Drawing Sheets

DEVICE FOR UNIFORMLY SPREADING POWDERY MATERIALS

BACKGROUND OF THE INVENTION

The present invention relates to a device for uniformly spreading powdery materials over a circular surface with the aid of a distribution chute suspended in a pivoting manner from a rotary cage and whose angle of tilt in relation to the vertical axis of the said cage is adjustable.

A device of this kind is proposed by document EP-A-0,343,466. Although not limited thereby, the present invention aims more particularly at the application of this known device for distributing lignite powder in a fluidized-bed lignite drier. In this application, the device for driving the chute has to meet two criteria which are mutually reconcilable only with difficulty. On the one hand, it is necessary at all costs to avoid the penetration of oil or of lubricant into the enclosure of the drier. On the other hand, the design of a conventional drive mechanism, for example, a gear driven mechanism, is difficult to conceive without lubrication if one desires to avoid the risk of seizing due to the deleterious action of fine particles of lignite powder.

SUMMARY OF THE INVENTION

The object of the present invention is to reconcile these two opposing requirements by proposing a device of the kind described in the preamble in which the risk of the moving parts seizing and the risk of lubricant penetrating into the drier are very small.

In order to achieve this objective, the device proposed by the present invention is essentially characterized in that the said cage is suspended from a peripheral annular ring having a vertical axis, the said ring having a peripheral edge which is vertically supported and laterally guided by wheels circumferentially spaced apart by an angle of 120°, these wheels being mounted by means of bearings on a frame supporting the said cage and in that the said cage is fitted with a peripheral annular sprocket in which is engaged an endless chain which transmits a rotary motion to the said cage.

This drive chain is a chain of the bicycle chain type, that is to say a self-cleaning chain which does not require lubrication.

Moreover, each support or guide wheel is mounted by means of lubricated bearings housed in the chambers filled with lubricant and isolated from the inside of the frame by a sealing system. This prevents, on the one hand, the penetration of dust into the bearing and, vice versa, the penetration of lubricant towards the inside of the drier. Given the small size of the support and guide wheels, leaktight seals will moreover be easily achieved and their maintenance will not cause any problems.

In a first embodiment variant, the cage is suspended by means of the said ring in three grooved wheels circumferentially spaced apart by 120° and which engage with the said peripheral edge of the ring. These three wheels therefore provide both a "vertical support" function and a "lateral guide" function.

The three grooved wheels have a vertical axis and can be radially moved in relation to the disc of the rotary cage in order to enable either the sheaves to be dismounted or the rotary cage to be dismounted. This possibility of radial movement of the sheaves may be achieved because the bearing of each grooved wheel is housed eccentrically, in the cylindrical seating of a casing whose rotation gives rise to a radial movement of the grooved wheel.

The operating position of two grooved wheels is stationary, whereas the operating position of the third grooved wheel is preferably, subjected to the action of at least one positioning spring in order to enable the thermal expansions and eccentricities of the disc to be compensated for. This third grooved wheel is, preferably, eccentrically housed in an intermediate bushing which, in turn, is eccentrically housed in the cylindrical seating of its casing, whereas the positioning spring acts between a support integrally connected to the casing and a support integrally connected to the bushing.

In a second embodiment variant, the cage bears, by means of the peripheral edge of the ring, on three identical smooth wheels whose horizontal axes are coplanar, form an angle of 120° between them and are directed towards the axis of rotation of the ring. In addition, it is guided in a horizontal plane by a further three smooth wheels which have vertical axes and which bear on the lateral edge of the ring at three locations circumferentially spaced apart by 120°.

Two of the wheels having vertical axes are stationary, whereas the third is mounted in such a way as to exhibit a certain radial elasticity in order to compensate for the eccentricities and variations in diameter of the ring.

In order to insure a stable rotational motion of the ring on the supporting wheels, the chute is preferably statically and dynamically balanced by a counterweight.

The above discussed and other features and advantages of the present invention will be understood by those skilled in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
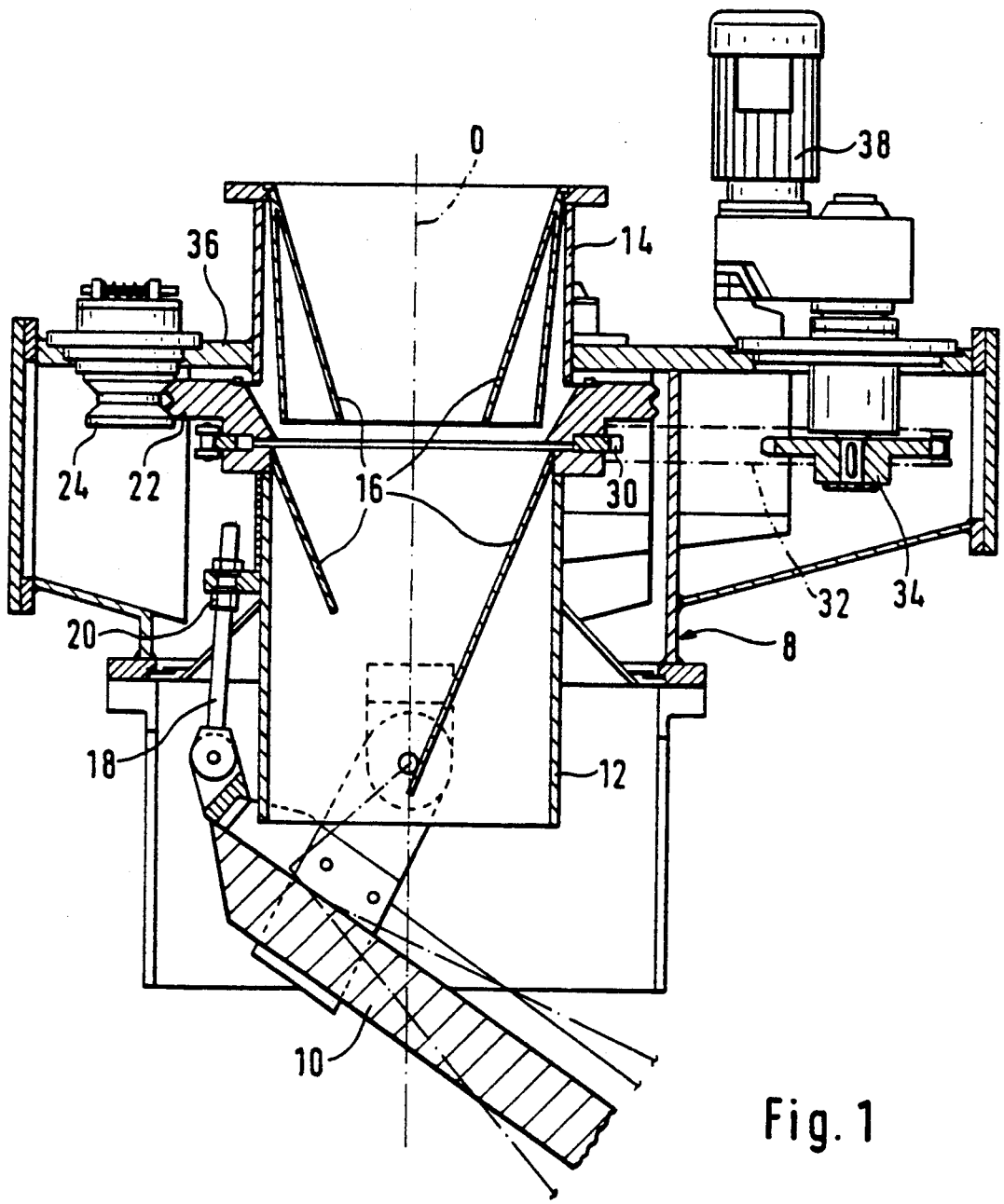
FIG. 1 shows a diagrammatic view, in vertical cross-section, of a spreader device according to the present invention, the suspension of the rotary cage comprising three grooved wheels.

FIG. 1 shows a distribution chute, of the kind described in the above-mentioned document, for spreading powdery materials, in this case lignite powder, uniformly over a circular surface in a lignite drier. The chute 10 is suspended in a pivoting manner from a rotary cage 12 through which the powder is tipped out onto the chute 10. On top of the cage 12 is a stationary feed channel 14 receiving the material from a storage bunker. Both the rotary cage 12 and the channel 14 may be provided with deflectors 16 for guiding the material into the chute. The tilt of the chute 10 in relation to the vertical axis 0 is determined by a rod 18 articulated on the rear end of the chute 10 and fixed to the outer wall of the cage 12. This tilt is, preferably, manually adjustable by virtue of positioning nuts 20 on the rod 18.

In order to enable the chute 10 to rotate, the cage 12 must be rotatably mounted inside its stationary support frame 8 which is placed above the drier (not shown).

As emerges from FIG. 1, which shows a first method for suspending the rotary cage 12 in its frame 8, the upper portion of the cage 12 is integrally connected to a peripheral annular ring 22. This ring 22 is supported and guided at its peripheral edge by three grooved wheels 24, 26, 28 arranged in a triangular arrangement in a horizontal plate 36 of the frame 8, surrounding the channel 14. The grooves of the wheels and the peripheral edge of the disc have complementary cross-sections which may be trapezoidal-shaped as shown in FIG. 1. It is also possible for these complementary shapes to be rounded. As a result, these grooved wheels 24, 26 and 28, vertically support the ring 22 and guide it in a horizontal plane and thus enable the cage 12 to rotate about the axis 0. For this purpose, an annular sprocket 30 is provided around the cage 12 or around a skirt of the ring 22 in order to engage with a drive chain 32 which, in accordance with the present invention, is a chain of the "Gall" type or a bicycle chain. The latter is driven by a toothed sprocket 34 which is actuated, through the plate 36, by means of a motor 38 mounted outside the frame 8. The chain 32 has the advantage of being self-cleaning, in so far as the teeth penetrating into the chain cause a self-cleaning thereof. In addition, it does not require lubrication, due to the combination of self-lubricating components which constitute the chain 32 and the annular sprocket 30.

The reference 40 (see FIG. 2) designates a roller tensioning the chain 32. This is a tensioner, known per se, mounted on a pivoting lever subjected to the action of a spring which applies the tensioner against the chain 32. Instead of the tensioning roller 40, it is possible to mount the motor unit 38 in a similar way on the frame 8, in order that it is subjected to the action of a spring in the direction diametrically opposite the rotary cage 12 in order to exert a constant traction on the chain 32.

Owing to the interpenetration between the grooved wheels 24, 26 and 28 on the one hand, and the peripheral edge of the ring 22 on the other hand, it would be very difficult, or indeed impossible, to dismount the wheels or the rotary cage. In order to overcome this, and according to one of the particular features of the present invention, each of the three grooved wheels 24, 26, 28 can be radially moved in order to release them from the ring 22 with a view to mounting or dismounting either the grooved wheels or the rotary cage 12 and the chute 10. This mounting will be explained in more detail by referring to FIG. 3 which shows a cross-section through the grooved wheel 26 and its housing. It remains to be noted that the grooved wheel 28 is mounted in the same manner as the grooved wheel 26.

Figure 2:
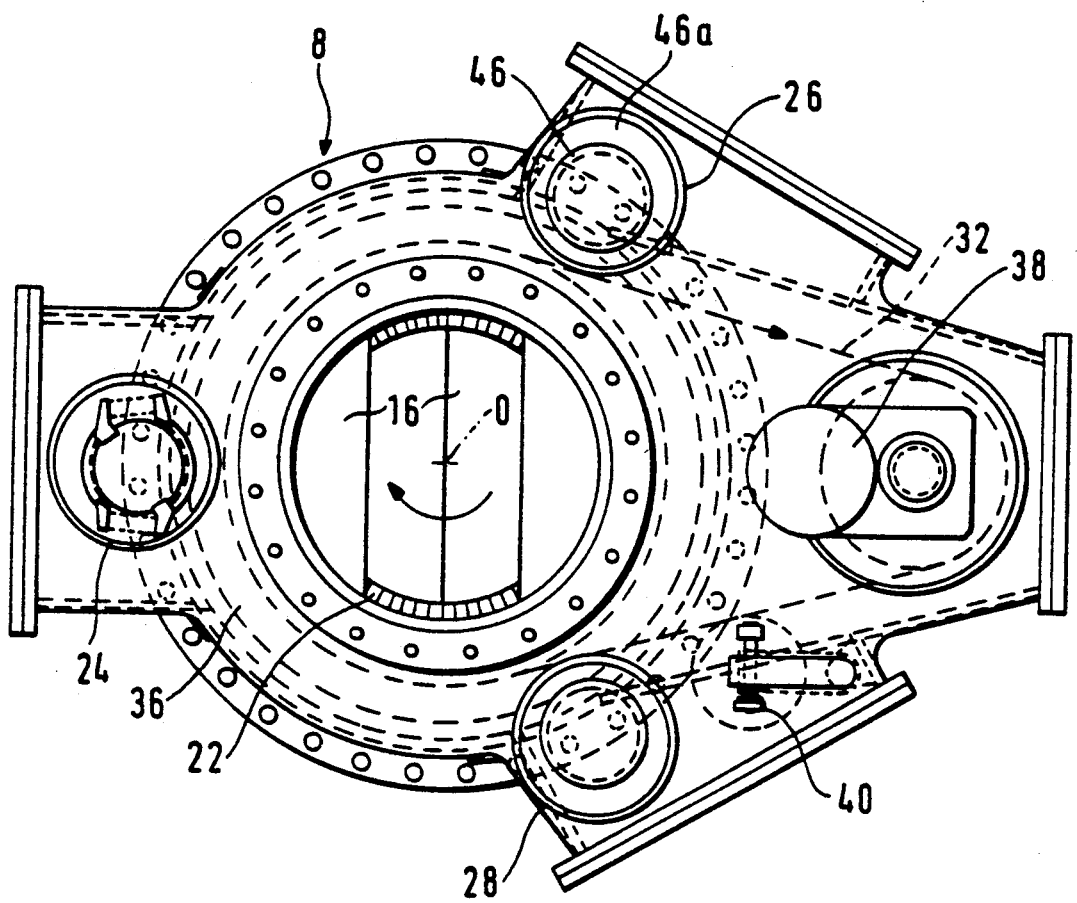
FIG. 2 shows a plan view of the device of FIG. 1.

The grooved wheel 26 is integrally connected to a coaxial shaft 42 which is housed by means of a roller bearing 44, known per se, in a cylindrical casing 46 closed in a sealed manner by a cover 48. This casing 46 is fixed by means of bolts 50 in a circular opening 52 of the plate 36. The positioning of the grooved wheel 26 and its bearing is eccentric in relation to the opening 52 and to the seating 46a of the casing 46 intended to penetrate into this opening 52. As a result the axis 54 of the wheel 26 and of its bearing is offset in relation to the axis 56 of the opening 52 and is closer to the ring 22. This eccentricity is also seen in FIG. 2.

In order to perform the dismounting, the bolts 50 fixing the casing 46 are removed in order to release the latter in relation to the plate 36. By rotating the casing 46 through 180° about the axis 56 of the opening 52, the eccentricity of the wheel 26 causes its axis 54 to rotate about the stationary axis 56 in order to place the axis 54 in a symmetrical position on the other side of the axis 56. This rotation moves the wheel 26 into the position shown by broken lines and completely releases it from its engagement with the ring 22. In this position it may be freely withdrawn through the opening 52. The mounting of the grooved wheel 26 comprises, of course, the reverse operations.

The reference 58 designates leaktight seals intended to insure perfect sealing between the shaft 42 and the casing 46. This enables the housing of the shaft 42 inside the casing 46 to be filled with lubricant in order to lubricate the bearing. It is even possible to provide means, such as a gauge or visual indicators in order to permanently monitor the level of lubricant in the casing 46.

The description given hereinabove applies, in an identical way, to the grooved wheels 24 and 28, with the exception that the mounting of the wheel 24 is a little more complicated in order to enable thermal expansions or eccentricities of the ring 22 to be compensated for. The reason for this is that, as a result of temperature variations, it is possible for the ring 22 to expand or contract or, ultimately, for it not to be perfectly round. Now, since the position of the wheels 26 and 28 is stationary, a certain elasticity has been provided in the mounting of the grooved wheel 24 in order for the latter to be able to compensate for any irregularity in the ring 22.

Figure 3:
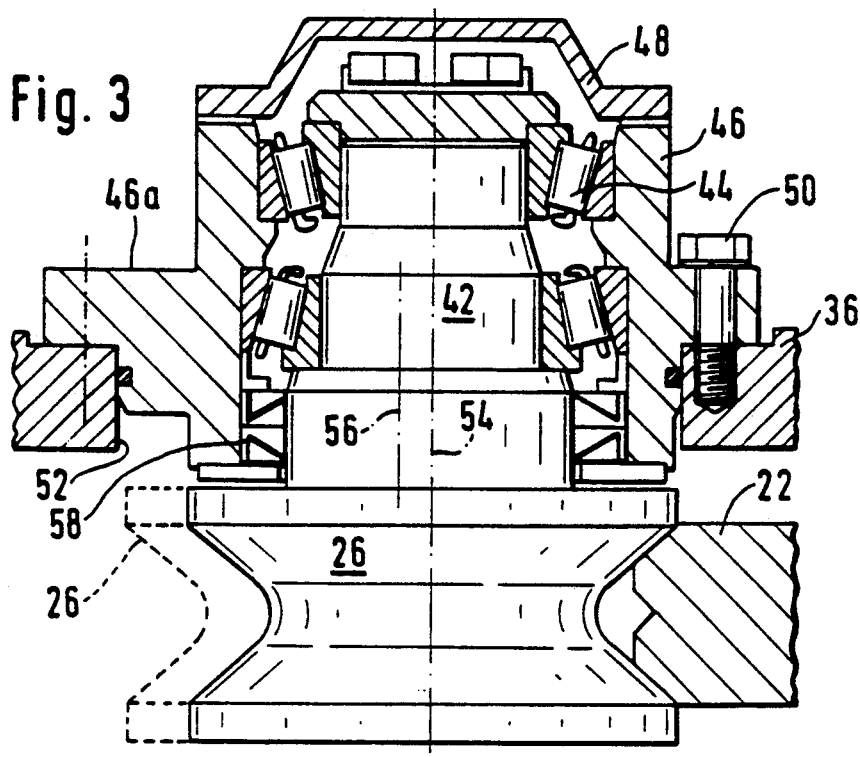
FIG. 3 shows, in longitudinal cross-section, the eccentric suspension of one grooved wheel in its casing.
Figure 4:
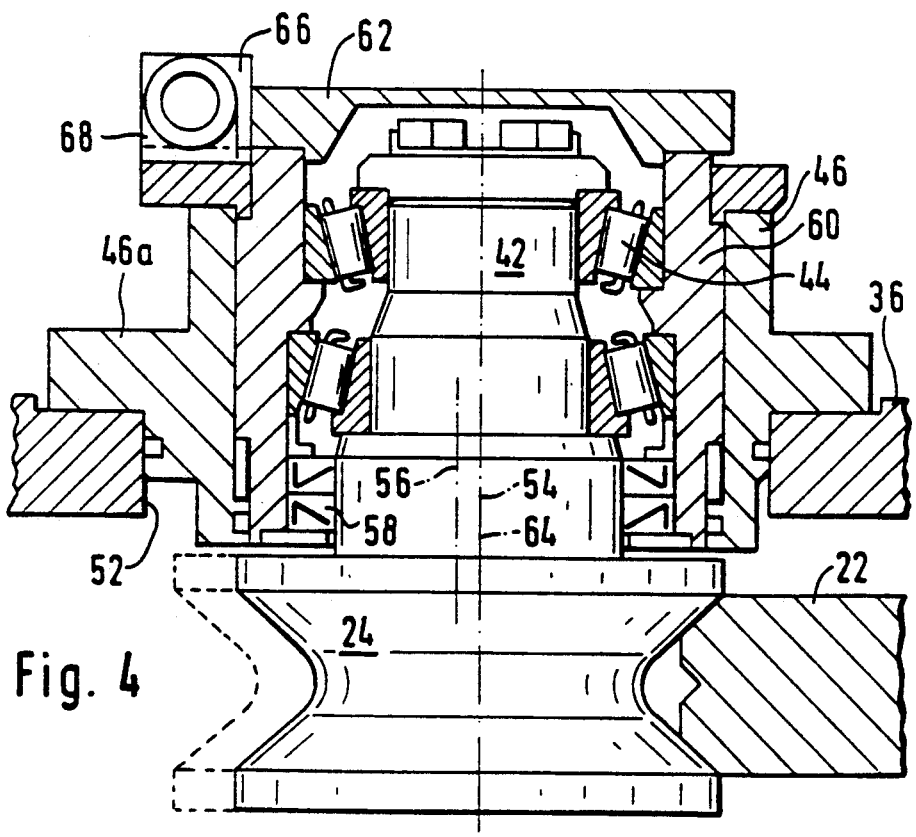
FIG. 4 shows, in broken cross-section, the elastic suspension, in the radial direction, of a third grooved wheel.

FIG. 4 shows the details of the elastic mounting, in the radial direction, of the grooved wheel 24. In this figure the same references have been used to designate the elements corresponding to those of FIG. 3. It will be noted that the wheel 24 is also eccentrically mounted in the casing 46 such that its axis 54 is offset in relation to the axis 56 in order to enable, by a rotation through 180° of the casing 46, the grooved wheel 24 to move from the position shown in solid lines to the position shown in broken lines.

The difference in relation to FIG. 3 is that an intermediate bushing 60 is interposed between the bearing 44 of the shaft 42 of the grooved wheel 24 and the lower cylindrical wall of the casing 46. This bushing 60 can rotate, inside the casing 46 about its axis 64. The cross-sectional plane of FIG. 4 is such that the axis 64 of the bushing 60 is coincident with the axis 54 of the wheel 24. However, the shaft 42 is eccentrically housed in the bushing 60, such that its axis 64 is offset in relation to the axis 54 of the grooved wheel 24. This offset between the axes 54 and 64 would be noticed in a cross-sectional plane perpendicular to that of FIG. 4. By contrast, in this perpendicular cross-sectional plane, the axis 64 would be coincident with the axis 56 when the grooved wheel is in the operating position.

This eccentricity between the axis 54 of the grooved wheel 24 and the axis 64 of the bushing 60 enables, by a rotation of the latter, a radial movement of the grooved wheel 24 in relation to the ring 22, which will be explained in more detail by referring to the following FIGURES.

The housing of FIG. 4 is closed, in a sealed manner, by a cover 62 which is applied this time on the bushing 60 and not on the casing 46, as is the case for the wheels 26 and 28. The cover 62 and the bushing 60 are subjected to the action of a spring which bears on the casing 46 and always keeps the grooved wheel 24 in engagement with the peripheral edge of the ring 22. Any motion of the grooved wheel 24 due to the effect of eccentricity or to a variation in diameter of the ring 22 will be countered by the action of this spring.

Figure 5:
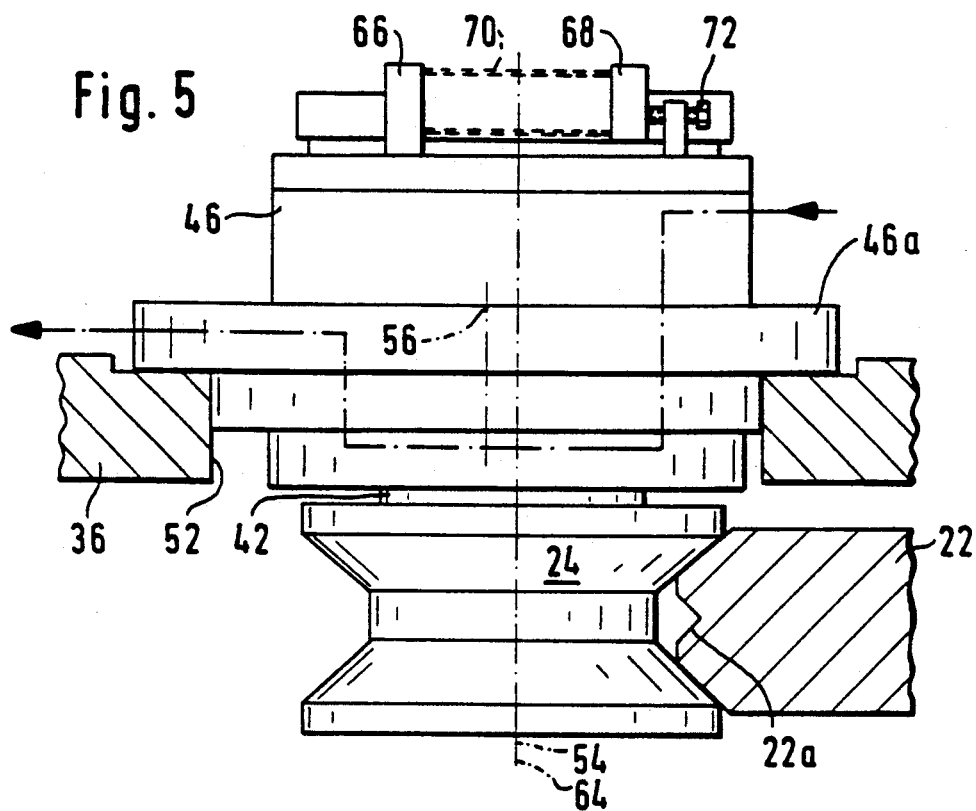
FIG. 5 shows an enlarged view of a grooved wheel and its housing.
Figure 6:
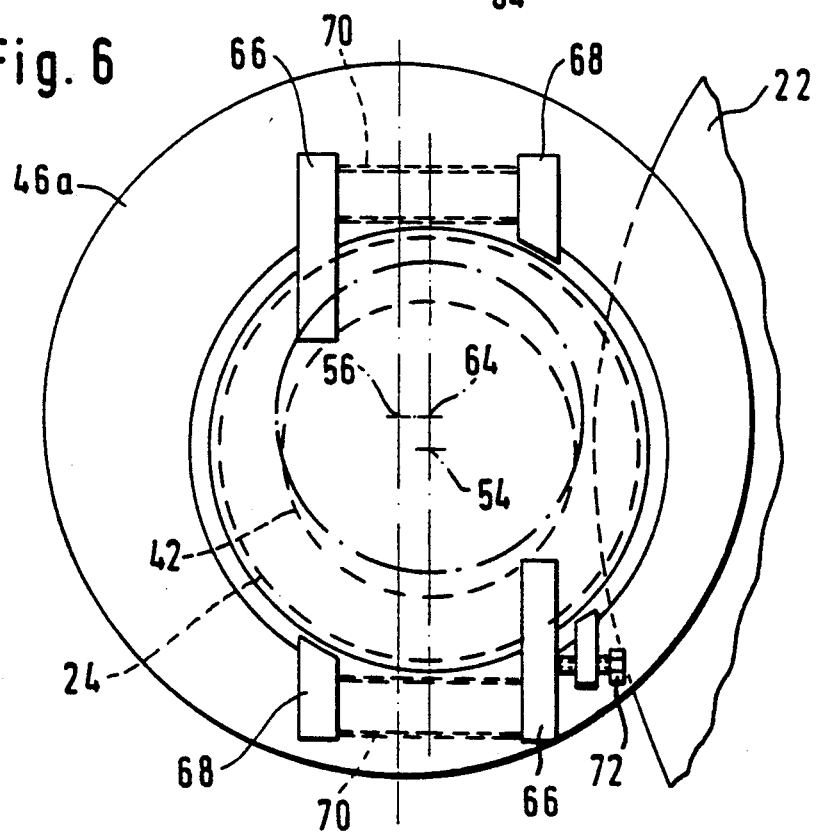
FIG. 6 shows a plan view of FIG. 5.

FIG. 5 shows a lateral view of the wheel 24 and of its housing casing 46 in the circular opening 52 of the plate 36. The reference 70 designates a powerful spring, for example a coil spring or a pneumatic spring under tension between a support 66 integrally connected to the casing 46 and a support 68 integrally connected to the movable bushing 60. An adjusting screw 72 acting on the support 68 of the bushing 60 enables the pre-stressing of the spring 70 to be adjusted and the grooved wheel 24 to be correctly positioned during the mounting. After mounting, the screw 72 may be completely unscrewed given that the grooved wheel 24 will be kept in place by the spring 70 which bears the grooved wheel 24 against the peripheral edge of the ring 22. As FIG. 6 shows, it is preferable, for reasons of symmetry of the forces, to provide duplicate springs 70 and supports 66 and 68 at diametrically opposed positions. By contrast, one adjustment screw 72 is sufficient.

FIG. 6 shows the eccentric positions of the three axes 54, 56 and 64, which enable the axis 54 to gravitate either about the axis 56 or about the axis 64, depending on whether the eccentricity in relation to the casing 46 or the eccentricity in relation to the bushing 60 is involved.

Figure 7:
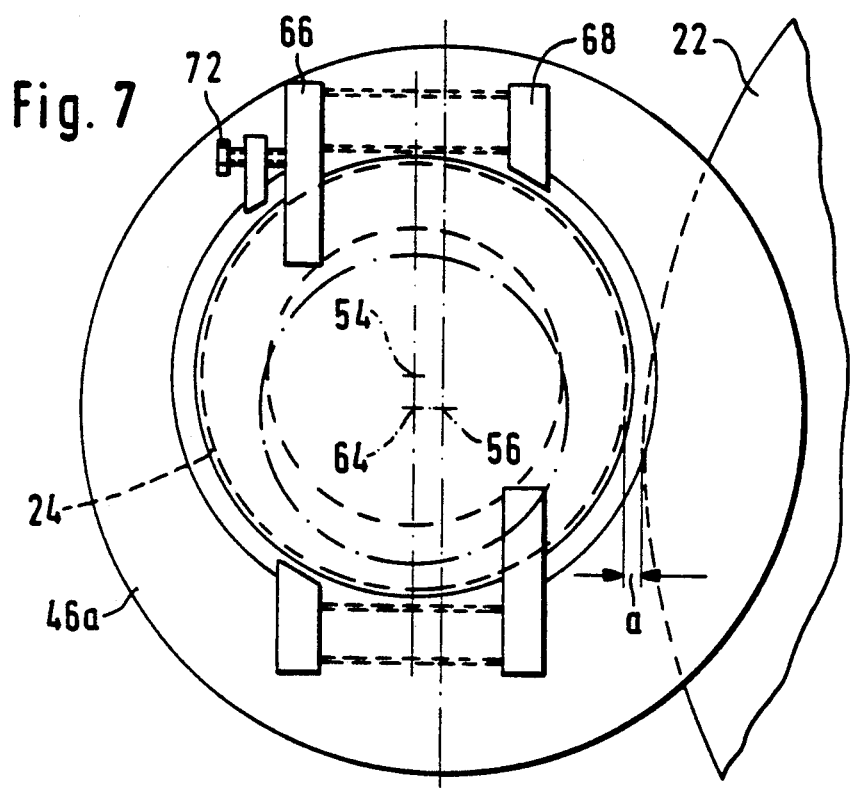
FIG. 7 shows a view corresponding to that of FIG. 6, after rotation through 180° in order to place the grooved wheel in the dismounting position.

FIG. 7 is a view similar to that of FIG. 6 and illustrates the positioning during the dismounting. This position is obtained by rotating through 180° the seating 46a of the casing in its opening 52, after having unbolted the casing from the plate 36. This rotation is carried out about the axis 56 of the opening 52 and places the two axes 54 and 64 into diametrically opposed position in relation to their respective positions in FIG. 6. This motion causes a radial movement of the grooved wheel 24 in order to release the latter from the ring 22, which is illustrated by the clearance (a) between the edge of the grooved wheel 24 and the peripheral edge of the ring 22. It should be noted that the mutual angular positions of the axes of the wheel 24 and of the bushing 60 do not change during this rotation of the casing 46.

Figure 8:
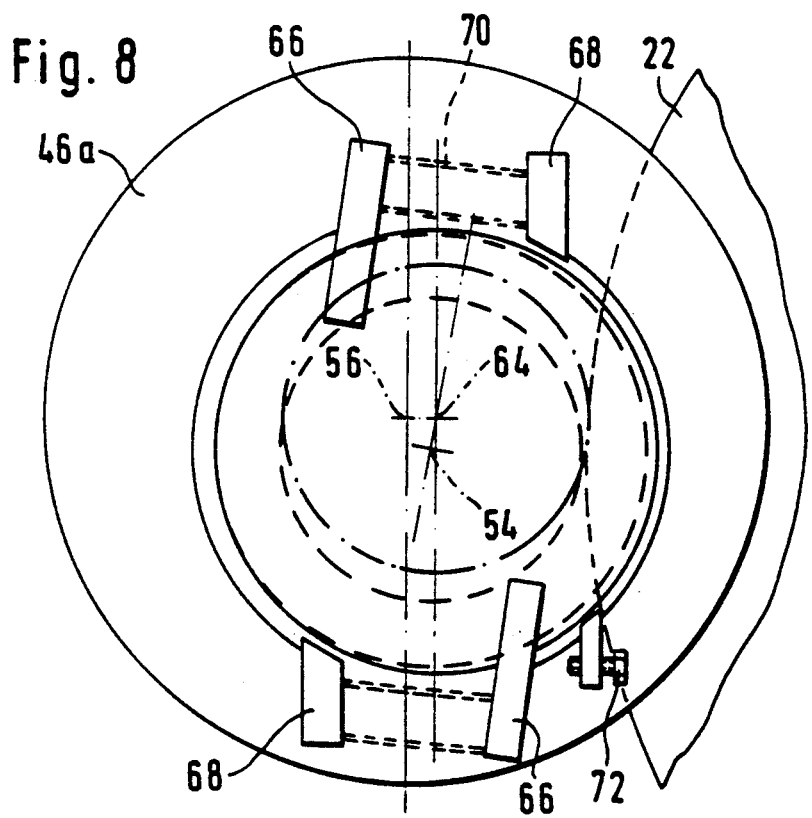
FIG. 8 is a view corresponding to that of FIG. 6, after a slight rotation resulting from thermal expansion or eccentricity of the disc.

FIG. 8 is a view similar to that of FIG. 6 and serves to illustrate the operation of the second eccentricity between the grooved wheel 24 and the bushing 60. This eccentricity may be involved especially during an increase in the external diameter of the ring 22 due to the effect of an increase in temperature. Such a thrust of the ring 22 on the grooved wheel 24 causes the bushing 60 to rotate about its axis 64 inside the casing 46. This rotation has to be carried out against the action of the springs 70 which are compressed by the supports 66 moving closer in relation to the stationary supports 68.

By virtue of the eccentric mounting of the grooved wheel 24 in relation to the bushing 60, the axis 54 of the grooved wheel 24 gravitates clockwise about the axis of rotation 64. This mounting consequently enables the grooved wheel 24 to be automatically positioned as a function of the eccentricities or expansions of the ring 22. By contrast, when the ring 22 contracts, the bushing 60 rotates anti-clockwise due to the effect of the thrust of the springs 70.

Figure 9:
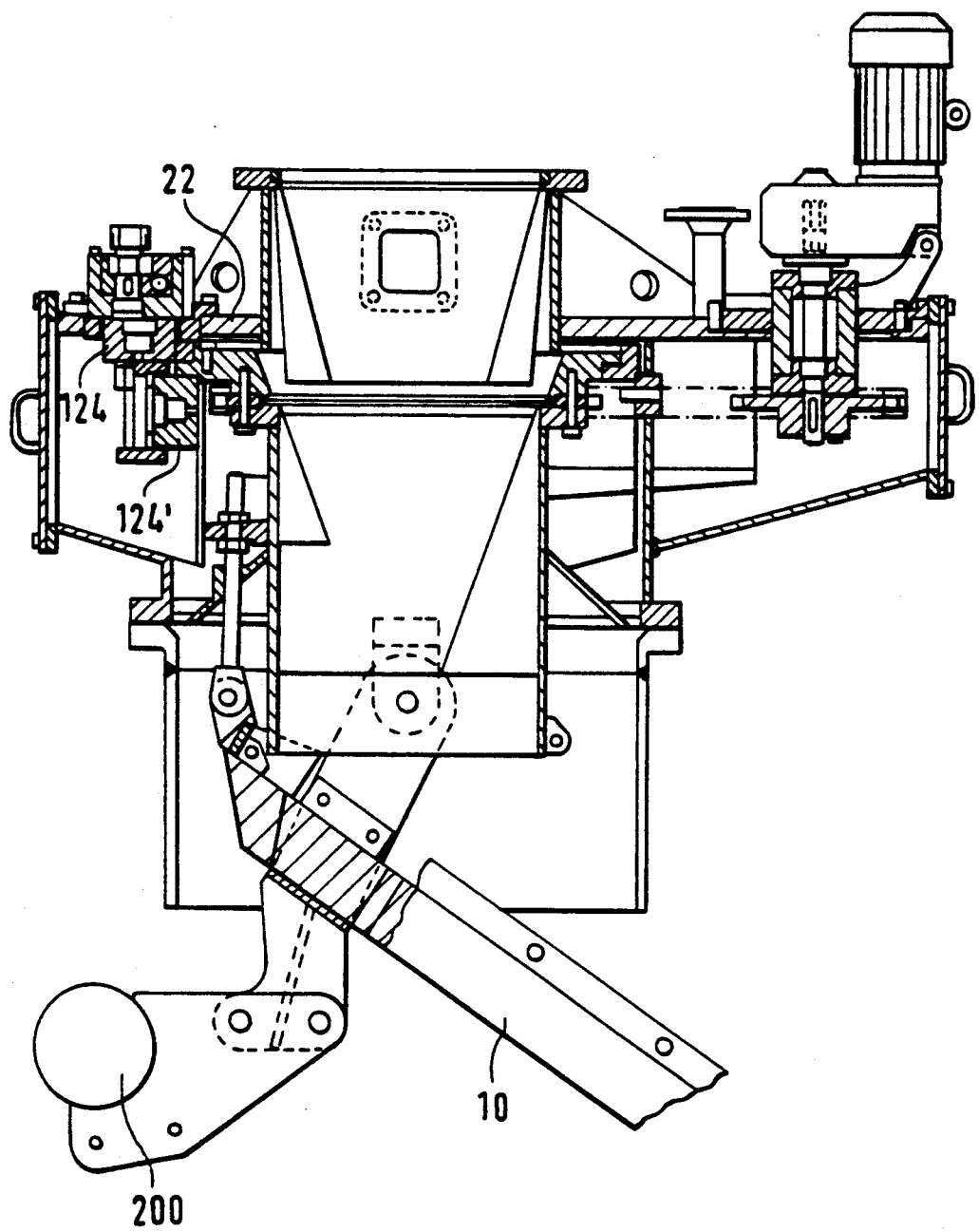
FIG. 9 is a view identical to FIG. 1, the suspension of the rotary cage comprising three pairs of smooth wheels and the chute being balanced by a counterweight.

FIG. 9 shows a device similar to that of FIG. 1, but instead of using three grooved wheels in order to support and guide the said annular ring 22, three pairs of smooth wheels 124, 124', 126, 126' and 128, 128' are used in order to obtain the same result.

It will be appreciated that this variant with three pairs of wheels has, in relation to the grooved wheels 24, 26, 28, the advantage of less wear of the wheels and of the ring 22. In addition, the dismounting of the wheels in this second variant may be performed more easily than in the first variant.

It will be noted that the first wheels 124, 126, 128 of each pair have a vertical axis of rotation and guide the ring 22 in a horizontal plane bearing on the lateral edge of the ring 22 at three locations circumferentially spaced apart by approximately 120°. By contrast, the second wheels 124', 126', 128' of each pair vertically support the ring 22. For this purpose they have horizontal axes and are disposed beneath the peripheral edge of the lower face of the ring 22 in such a way that their coplanar axes form between them an angle of 120° and are directed towards the axis of rotation of the ring 22.

In contrast to the grooved wheels 24, 26, 28 which served both as supports and as guides, in the present embodiment the "vertical support" function is separated from the "lateral guide" function. The first function is performed by the wheels 124', 126', 128' having horizontal axes, whereas the second function is performed by the wheels 124, 126, 128 having vertical axes.

Figure 10:
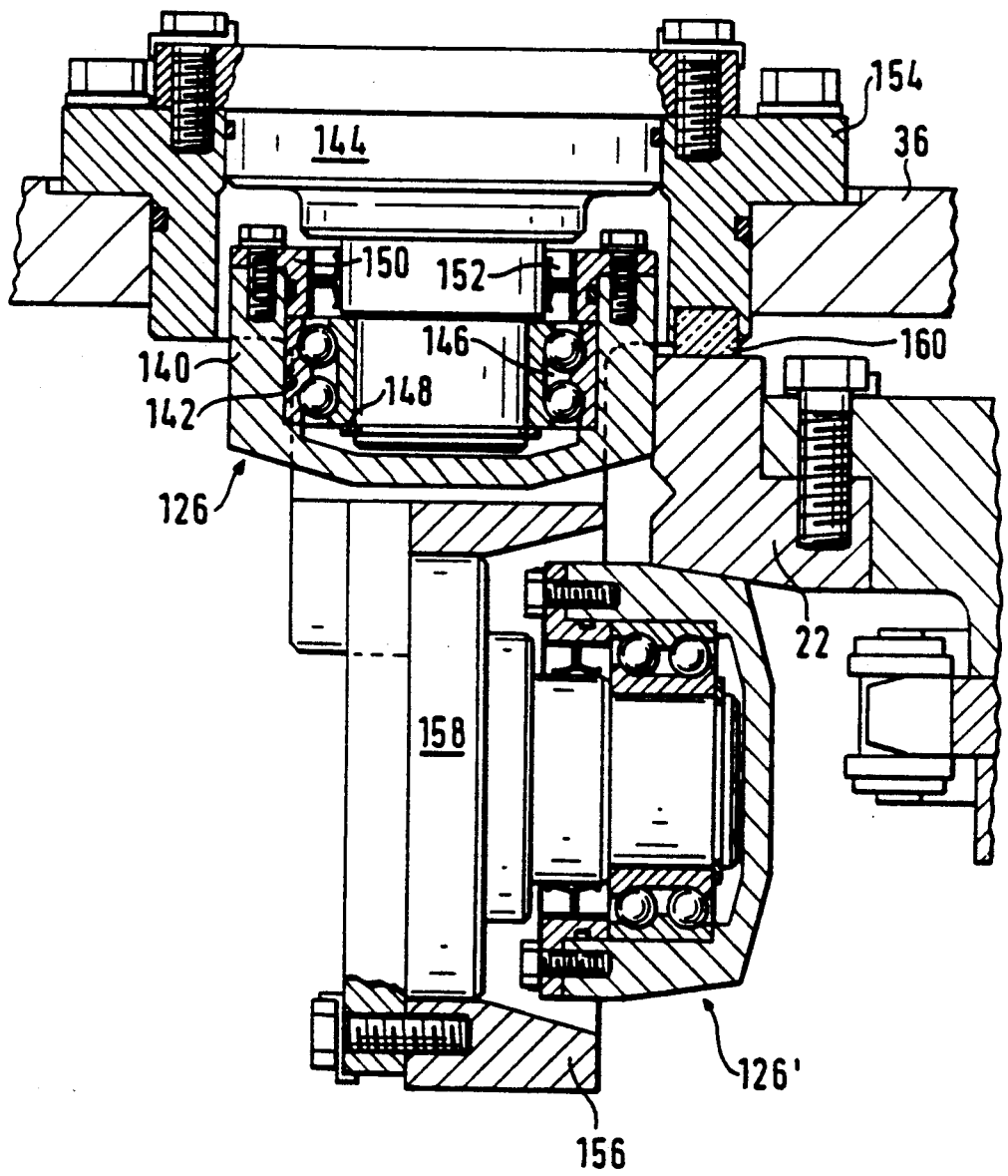
FIG. 10 is a longitudinal cross-section of the mounting of a pair of wheels supporting and guiding the chute.

FIG. 10 shows the details of the mounting of a pair of smooth wheels 126, 126'. The wheel 126 is constituted by a thick disc 140 which is provided, in one of its bases, with a blind axial borehole 142. This wheel 126 is mounted on the lower end of a stationary vertical shaft 144 with the aid of a ball bearing 146. The inner race of this bearing 146 is fitted over the shaft 144 and is secured against axial movement by an elastic ring 148. The outer race is fitted into the said blind borehole 142 of the wheel 126, in which it is kept in place by a sleeve 150 screwed onto the wheel 126. The sleeve 150 is provided with a leaktight sealing ring 152 which closes radially around the shaft 144, in such a way as to define a leaktight housing chamber for the bearing 146, which can be filled with a lubricant.

At its upper end, the shaft is screwed to a support collar 154 which is itself mounted in an opening of the plate 36. This support collar 154 is extended downwards by a vertical arm 156. In an opening of this arm is fixed one end of a second shaft 158 whose horizontal axis is oriented in a diametral direction of the ring 22. This shaft 158 supports at its other end the wheel 126', which is mounted with the aid of a ball bearing, in the same way as the wheel 126. An abutment surface 160, vertically above this wheel 126' and facing the upper face of the ring 22, is incorporated in the support collar 154. This abutment surface 160 prevents upward axial movement of the ring 22 resting freely on the wheels 124', 126' and 128'. In normal operation, a clearance is insured between the abutment surface 160 and the upper face of the ring 22. Moreover, similar abutments are also provided vertically above the wheels 124' and 128'.

The second pair of wheels 128, mounted in exactly the same way, at an angular separation of 120° from the pair of wheels 126, 126', against the peripheral edge of the ring 22

The third pair of wheels 124, 124' is distinguished from the two other pairs of wheels only by a special mounting of the wheel 124 having a vertical axis, which confers on the latter an elasticity in the radial direction of the ring 22. The wheel 124 may thus compensate for the eccentricities and variations in diameter of the ring 22. Moreover, the mounting of the wheel 124 is carried out according to the principle which has been developed for the grooved wheel 24. However, by way of an embodiment variant, the bushing having an eccentric borehole has been replaced in the present embodiment by a shaft having an eccentric axis.

Figure 11:
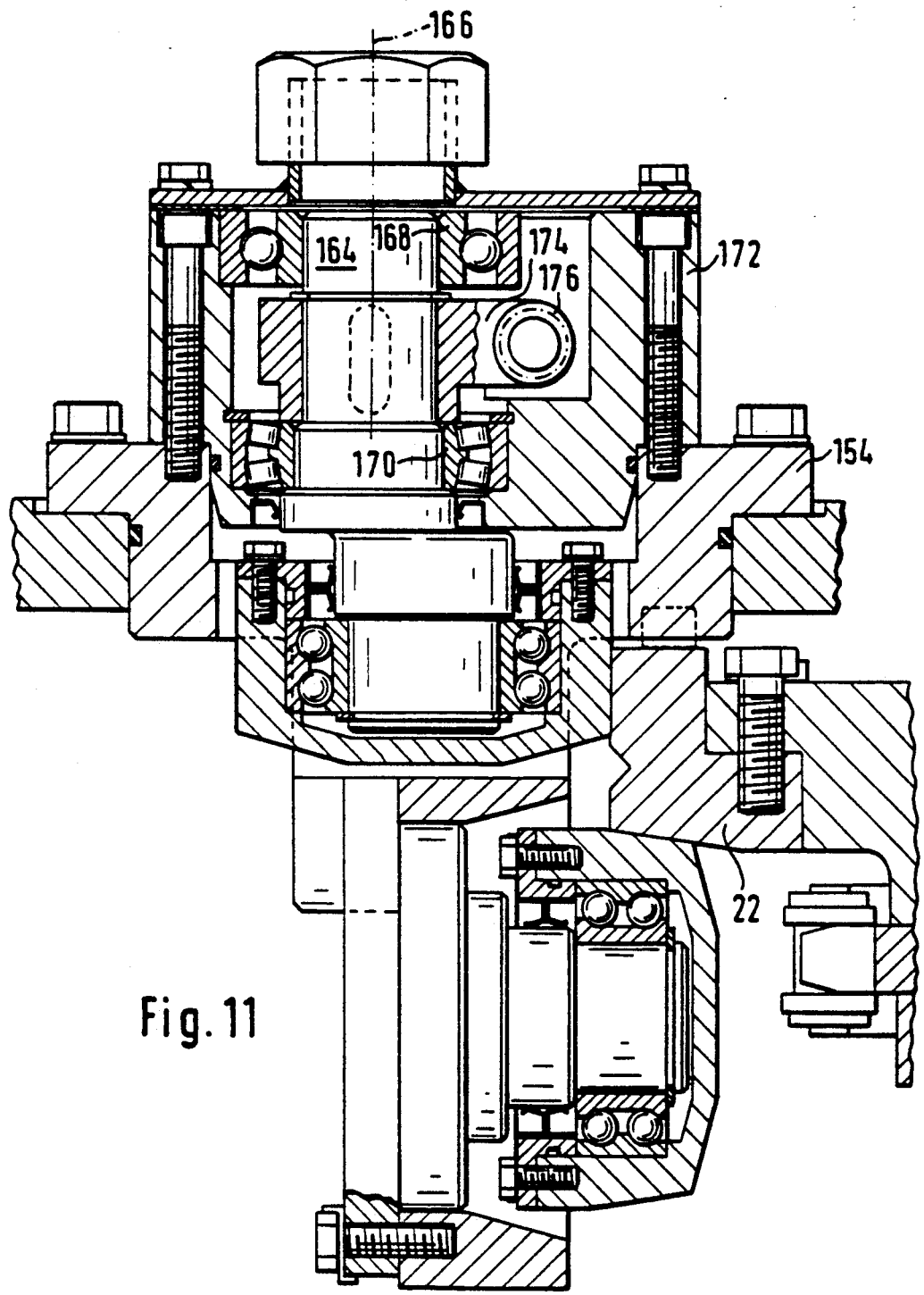
FIG. 11 is a cross-section similar to that of FIG. 10, the guide wheel being elastically mounted in order to compensate for eccentricities and variations in diameter.

FIG. 11 shows this mounting in detail. It should be noticed first of all that the cross-section through the mounting of the upper wheel is a cross-section, through a perpendicular plane, which has been turned back into the plane of the FIGURE.

It is seen that the lower end of a shaft 164 supports the wheel 124 in exactly the same way as that described for the wheel 126. However, the upper end of the shaft 164 is no longer screwed to the said support collar 154 but is mounted in such a way as to be able to rotate about its axis 166, by virtue of a mounting on ball bearings 168 and roller bearings 170 which is incorporated in a leak-tight casing 172 which is screwed to the said support collar 154. It will be noted that the axis 166 is offset in relation to the axis of the lower end of the shaft 16 supporting the wheel 124.

An arm 174 is integrally the shaft 164 and a stiff spring 176 bears on this arm 174 with one of its ends and bears on the casing 172 with its other end. The shaft 164 is therefore subjected to a torque which attempts to rotate it about its axis 166. Now, as the wheel 124 is eccentric in relation to this axis 166, it is subjected to a moment which applies it against the lateral edge of the ring 22. The wheel 124 may therefore elastically follow a variation in diameter or a local eccentricity of the ring 22.

The ring 22 is consequently guided in a horizontal plane by two wheels 126 and 128 having stationary vertical axes and by a wheel 124 whose vertical axis is subjected to an elastic moment which provides the contact between the wheel 124 and the ring 22.

In the above-mentioned preferred embodiment, a wheel having a horizontal axis has in each case been associated with a wheel having a vertical axis in a mounting on a common support collar 154. However, it is obvious that the wheels having horizontal axes and the wheels having vertical axes could also be mounted independently of each other.

It remains to be noted that the supporting surfaces of the six wheels are preferably slightly rounded in order to achieve an optimal contact with the corresponding supporting surfaces of the ring 22, for example in the case of manufacturing inaccuracies or of deformations.

In FIG. 9 it is seen that the chute 10 is fitted with a counterweight 200. This counterweight is preferably dimensioned in such a way that the center of gravity of the chute-counterweight assembly is on the axis of rotation of the ring 22. In this way, the vertical bearing forces on the wheels 124', 126' and 128' do not depend on the position of the chute, which enables a rocking movement of the ring 22 on its three supports 124', 126' and 128' to be avoided when the chute 10 is rotated. In addition, the placing of the counterweight is chosen in such a way that the centrifugal forces due to the counterweight on the one hand, and to the chute on the other hand, cancel each other out. In this way, the ring 22 is free of all moments and of all forces which could lead to unstable motion of the ring 22 on its support wheels 124, 124', 126, 126', 128, 128'.

It is possible to provide suitable means for supporting the rotary cage 12 by means of the ring 22 in the event of dismounting of one or more wheels, both in the first and in the second variant embodiment. For this purpose, it is possible to provide a peripheral groove 22a in the outer edge of the ring 22 as shown in FIG. 5. Before carrying out the dismounting of one or more wheels, it suffices to engage, at suitable locations through the frame 8 point-headed screws intended to penetrate into the channel 22a in order to support the ring 22 in the absence of wheels.

It is even possible to provide means for keeping a slight overpressure in the region of the ring 22 and of the wheels in order to keep dust and powder particles away.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A device for uniformly spreading powdery materials over a circular surface comprising:
    a frame;
    cage means supported by said frame, said cage means having a peripheral annular sprocket;
    chute means pivotably suspended from said cage means, wherein an angle of tilt of said chute means in relation to a vertical axis of said cage means is adjustable;
    an annular ring having a vertical axis, said annular ring being integrally connected to said cage means, said annular ring having a peripheral edge;
    three guiding wheels having vertical axes of rotation circumferentially spaced apart by an angle of about 120°, said peripheral edge of said annular ring being radially guided by said guiding wheels, wherein a first and a second of said guiding wheels have a stationary operating position and a third guiding wheel being mounted in such a way as to exhibit a radial elasticity,
    a plurality of circumferentially spaced apart supporting wheels, said peripheral edge of said annular ring being vertically supported and laterally guided by said supporting wheels;
    first bearing means for mounting each of said supporting wheels and said guiding wheels to said frame; and
    an endless chain engaging said annular sprocket of said cage means for transmitting rotary motion to said cage means.

2. The device of claim 1 further comprising:
leaktight housing chambers wherein each of said bearing means is housed, said chambers being filled with a lubricant.

3. The device of claim 1 wherein said peripheral edge of said annular ring engages said wheels; and
wherein said wheels comprise three grooved wheels having vertical axes which are circumferentially spaced apart by about 120° about said annular ring.

4. The device of claim 3 wherein said three grooved wheels are radially movable in relation to said annular ring and said cage means between an operating position and an extraction position.

5. The device of claim 4 further comprising:
a plurality of leaktight casings each having a cylindrical seating, each of said first bearing means being eccentrically housed in a corresponding one of said casings, the rotation of which causes a radial movement of said grooved wheels.

6. The device of claim 3 wherein a first and second of said grooved wheels comprise a stationary operating position; and
spring means for positioning a third of said grooved wheels whereby said third grooved wheel comprises an operating position subject to the action of said spring means.

7. The device of claim 6 further comprising:
an intermediate bushing, said third wheel being eccentrically housed in said bushing, said bushing being eccentrically housed in said cylindrical seating of said casing;
first support means integrally connected to said bushing; and
second support means integrally connected to said casing, said spring means being under tension between said first and second support means.

8. The device of claim 7 further comprising:
adjusting screw means acting on said first support means for adjusting the pretensioning of said spring means.

9. The device of claim 1 wherein said plurality of circumferentially spaced apart supporting wheels comprises:
three first smooth wheels having coplanar horizontal axes of rotation, said horizontal axes forming an angle of about 120° therebetween and are directed towards an axis of rotation of said annular ring, said peripheral edge of said annular ring bears vertically on said first smooth wheels.

10. The device of claim 9 further comprising:
an abutment surface integrally connected to said frame for limiting an upward axial clearance of said annular ring, said abutment surface being disposed vertically above said first smooth wheels facing an upper face of said annular ring.

11. The device of claim 1 further comprising:
counterweight means for statically and dynamically balancing said chute means.

12. The device of claim 1 wherein said annular ring includes a peripheral channel, said channel being receptive to at least three suspension screws engageable through said frame.

13. The device of claim 1 wherein said third guiding wheel exhibiting a radial elasticity includes:
an eccentrically mounted vertical axis; and
first spring means for engaging said third guiding wheel.

14. A device for uniformly spreading powdery materials over a circular surface comprising:
a frame;
cage means supported by said frame, said cage means having a peripheral annular sprocket;
chute means pivotably suspended from said cage means, wherein an angle of tilt of said chute means in relation to a vertical axis of said cage means is adjustable;
an annular ring having a vertical axis, said annular ring being integrally connected to said cage means, said annular ring having a peripheral edge;
a plurality of circumferentially spaced apart wheels, said peripheral edge of said annular ring being both vertically supported and laterally guided by said wheels; wherein said wheels comprise:
 (a) three first smooth wheels having coplanar horizontal axes of rotation, said horizontal axes forming an angle of about 120° therebetween and being directed towards an axis of rotation of said annular ring, wherein said peripheral edge of said annular ring bears vertically on said first smooth wheels; and
 (b) three second smooth wheels having vertical axes circumferentially spaced apart at about 120°, said peripheral edge of said annular ring being laterally guided by said second smooth wheels;
first bearing means for mounting each of said wheels to said frame;
an endless chain engaging said annular sprocket of said cage means for transmitting rotary motion to said cage means; and
an abutment surface integrally connected to said frame for limiting an upward axial clearance of said annular ring, said abutment surface being disposed vertically above said first smooth wheels facing an upper face of said annular ring.

15. A device for uniformly spreading powdery materials over a circular surface comprising:
a frame;
cage means supported by said frame, said cage means having a peripheral annular sprocket;
chute means pivotably suspended from said cage means, wherein an angle of tilt of said chute means in relation to a vertical axis of said cage means is adjustable;
an annular ring having a vertical axis, said annular ring being integrally connected to said cage means, said annular ring having a peripheral edge;
a plurality of circumferentially spaced apart wheels, said peripheral edge of said annular ring being both vertically supported and laterally guided by said wheels; wherein said wheels comprise:
 (a) three first smooth wheels having coplanar horizontal axes of rotation, said horizontal axes forming an angle of about 120° therebetween and being directed towards an axis of rotation of said annular ring, wherein said peripheral edge of said annular ring bears vertically on said first smooth wheels; and
 (b) three second smooth wheels having vertical axes circumferentially spaced apart at about 120°, said peripheral edge of said annular ring being laterally guided by said second smooth wheels;
wherein a first and second of said second smooth wheels have stationary vertical axes and a third of said second smooth wheels has an eccentrically mounted vertical axis; and first spring means, said third wheel being subjected to the action of said first spring means;

first bearing means for mounting each of said wheels to said frame; and an endless chain engaging said annular sprocket of said cage means for transmitting rotary motion to said cage means;

an abutment surface integrally connected to said frame for limiting an upward axial clearance of said annular ring, said abutment surface being disposed vertically above said first smooth wheels facing an upper face of said annular ring.

16. The device of claim 15 further comprising:

a leaktight casing;

a shaft having an eccentric end, said third wheel being mounted on said eccentric end;

second bearing means for mounting said shaft within said leaktight casing;

an arm disposed adjacent to said shaft; and second spring means bearing on said leaktight casing.

* * * * *